(12) United States Patent
Wu et al.

(10) Patent No.: US 11,926,192 B2
(45) Date of Patent: Mar. 12, 2024

(54) REFRIGERANT HEAT EXCHANGE APPARATUS AND INDIRECT HEAT PUMP SYSTEM

(71) Applicant: AIR INTERNATIONAL THERMAL SYSTEMS R&D (SHANGHAI) CO., LTD, Shanghai (CN)

(72) Inventors: Duo Wu, Shanghai (CN); Zhaokai Yu, Shanghai (CN); Qi Liu, Shanghai (CN); Jingyang Mu, Shanghai (CN)

(73) Assignee: AIR INTERNATIONAL THERMAL SYSTEMS R&D (SHANGHAI) CO., LTD (CN)

( * ) Notice: Subject to any disclaimer, the term of this patent is extended or adjusted under 35 U.S.C. 154(b) by 0 days.

(21) Appl. No.: 18/258,126

(22) PCT Filed: Apr. 6, 2022

(86) PCT No.: PCT/CN2022/085368
§ 371 (c)(1),
(2) Date: Jun. 16, 2023

(87) PCT Pub. No.: WO2023/060852
PCT Pub. Date: Apr. 20, 2023

(65) Prior Publication Data
US 2023/0398831 A1 Dec. 14, 2023

(30) Foreign Application Priority Data
Oct. 12, 2021 (CN) .......................... 202111186309.0

(51) Int. Cl.
*B60H 1/00* (2006.01)
(52) U.S. Cl.
CPC ..... *B60H 1/00342* (2013.01); *B60H 1/00485* (2013.01)

(58) Field of Classification Search
CPC ........................ B60H 1/00342; B60H 1/00485
See application file for complete search history.

(56) References Cited

U.S. PATENT DOCUMENTS

| | | | | |
|---|---|---|---|---|
| 3,227,175 A | * | 1/1966 | Remington | ............. C02F 1/685 251/303 |
| 3,477,498 A | * | 11/1969 | Caldwell | .................. G05D 7/03 165/283 |

(Continued)

FOREIGN PATENT DOCUMENTS

| | | |
|---|---|---|
| CN | 104896612 A | 9/2015 |
| CN | 204787417 U | 11/2015 |

(Continued)

OTHER PUBLICATIONS

International Search Report dated Jul. 6, 2022 in International Application No. PCT/CN2022/085368.

(Continued)

*Primary Examiner* — Ljiljana V. Ciric
(74) *Attorney, Agent, or Firm* — Kim IP Law Group LLC

(57) ABSTRACT

A refrigerant heat exchange apparatus includes an apparatus body, a first communication cavity, a second communication cavity, and first valve cores. A cold water unit and a hot water unit are disposed in the apparatus body. A first water inlet is disposed on the first cavity of the cold water unit. A first water inlet is disposed on the third cavity of the hot water unit. A first water outlet is disposed on the second cavity of the cold water unit. A first water outlet is disposed on the fourth cavity of the hot water unit. The first communication cavity communicates with the first cavity and the third cavity. The second water outlet communicates with the first communication cavity. The second communication cavity communicates with the second cavity and the fourth cavity. An indirect heat pump system includes the refrigerant heat exchange apparatus.

12 Claims, 10 Drawing Sheets

(56) References Cited

U.S. PATENT DOCUMENTS

| | | | | |
|---|---|---|---|---|
| 3,966,119 | A * | 6/1976 | Harter | F16K 5/04 237/12.3 B |
| 4,346,729 | A * | 8/1982 | Franz | B60H 1/00485 137/353 |
| 4,361,170 | A * | 11/1982 | Peloza | B60H 1/00485 251/305 |
| 4,874,010 | A * | 10/1989 | DeJong | F16K 11/052 137/484.4 |
| 5,184,773 | A * | 2/1993 | Everingham | B60H 1/00485 137/625.5 |
| 5,322,217 | A * | 6/1994 | Brocx | B60H 1/00885 137/115.06 |
| 9,347,577 | B2 * | 5/2016 | Peterson | F16K 31/0603 |
| 9,599,244 | B2 * | 3/2017 | Peterson | F16K 31/0624 |
| 10,066,878 | B2 * | 9/2018 | Huang | F25B 40/00 |
| 10,391,839 | B2 * | 8/2019 | Kawakubo | F25B 29/003 |
| 10,948,930 | B2 * | 3/2021 | Qiu | F16H 57/0413 |
| 11,285,781 | B2 * | 3/2022 | Chen | F28F 27/02 |
| 11,614,171 | B2 * | 3/2023 | Su | F16K 1/425 251/129.15 |
| 2013/0008532 | A1 * | 1/2013 | Kambouris | B65D 47/2037 137/544 |
| 2018/0222289 | A1 * | 8/2018 | Kawakubo | F16K 11/048 |
| 2023/0098030 | A1 * | 3/2023 | Liu | F16K 11/165 251/129.01 |
| 2023/0398831 | A1 * | 12/2023 | Wu | B60H 1/00485 |

FOREIGN PATENT DOCUMENTS

| | | | |
|---|---|---|---|
| CN | 205900742 U | 1/2017 | |
| CN | 106813517 A | 6/2017 | |
| CN | 108068572 A | 5/2018 | |
| CN | 108068576 B * | 9/2020 | ......... B60H 1/00271 |
| CN | 111811153 A | 10/2020 | |
| CN | 112361629 A | 2/2021 | |
| CN | 112477549 A | 3/2021 | |
| CN | 112622563 A | 4/2021 | |
| CN | 110073164 B * | 7/2021 | ......... B60H 1/00271 |
| CN | 113212104 A | 8/2021 | |
| CN | 214222094 U | 9/2021 | |
| CN | 113883747 A | 1/2022 | |
| CN | 114382919 B * | 8/2023 | |
| DE | 112013004804 B4 * | 1/2020 | ............. B23P 15/26 |
| EP | 0022264 A1 | 1/1981 | |
| EP | 3540352 A1 * | 9/2019 | ......... B60H 1/00271 |
| JP | 2019533797 A * | 11/2019 | |
| KR | 20160082887 A | 7/2016 | |
| WO | WO-2018086553 A1 * | 5/2018 | ......... B60H 1/00271 |

OTHER PUBLICATIONS

Chinese Office Action in counterpart CN 112477549 dated Nov. 23, 2022.

Written Opinion dated Jul. 6, 2022 in international Patent Application No. PCT/CN2022/085368.

* cited by examiner

REFRIGERANT HEAT EXCHANGE APPARATUS AND INDIRECT HEAT PUMP SYSTEM

CROSS-REFERENCE TO RELATED APPLICATIONS

This is a National Stage Application, filed under 35 U.S.C. 371, of International Patent Application No. PCT/CN2022/085368, filed on Apr. 6, 2022, which claims priority to Chinese Patent Application No. 202111186309.0 filed with the China National Intellectual Property Administration (CNIPA) on Oct. 12, 2021, the disclosures of which are incorporated herein by reference in their entireties.

TECHNICAL FIELD

The present application relates to the field of heat-pump air conditioner technology, for example, a refrigerant heat exchange apparatus and an indirect heat pump system.

BACKGROUND

For air conditioning systems on new energy vehicles, electricity is mainly used for energy consumption. However, considering the fixed electric capacitance of a new energy vehicle, the waste heat of an engine cannot be used for effective heating. The energy consumption of the air conditioning systems affects the endurance capacity of new energy, forcing the technology of the air conditioning systems on the new energy vehicles to become more inclined to implement energy conservation and efficient energy utilization.

In the related arts, heat-pump air conditioners on vehicles mostly use direct heat pump systems. In a direct heat pump system, an evaporator in a heating, ventilation, and air conditioning box (referred to as an HVAC hereinafter) of a passenger compartment is used for cooling the passenger compartment; a condenser in the HVAC is used for heating the passenger compartment; and the evaporator, the condenser, and a chiller plate heat exchanger for cooling a battery pack serve as refrigerant components and form one system containing multiple heat exchangers. However, such a direct heat pump system has the defects below.
1. The direct heat pump system has a large number of heat exchangers, resulting in a large number of refrigerant circuits, the complex configuration of refrigerant pipelines, long pipelines, a large number of electromagnetic shut-off valves in the refrigerant circuit, and a large number of throttle valves in the refrigerant circuit.
2. Control valves and elements need to be connected to pipelines, resulting in excessive joints. The complex pipeline connection is easy to raise the risk of refrigerant leakage.
3. Connection pipelines of the entire system occupy much space, being unfavorable for arranging the heat pump system on a vehicle and affecting the production efficiency of the vehicle.

SUMMARY

Embodiments of the present application provide a refrigerant heat exchange apparatus. The simple structure of the refrigerant heat exchange apparatus simplifies refrigerant pipelines. Moreover, simple pipeline wiring reduces the use of control valves and reduces costs.

Embodiments of the present application provide an indirect heat pump system. With a simple structure and with pipelines occupying a small space, the indirect heat pump system is easy to arrange.

Embodiments of the present application adopt the technical solutions below.

Embodiments of the present, application provide a refrigerant heat exchange apparatus. The refrigerant heat exchange apparatus includes an apparatus body, a first communication cavity, a second communication cavity, and first valve cores. A cold water unit and a hot water unit are disposed in the apparatus body. The cold water unit includes a first cavity and a second cavity. The hot water unit includes a third cavity and a fourth cavity. A first water inlet is disposed on the first cavity. A first water inlet is disposed on the third cavity. A first water outlet is disposed on the second cavity. A first water outlet is disposed on the fourth cavity. The first water inlet of the first cavity and the first water outlet of the second cavity are connected to a first heat exchanger. The first water inlet of the third cavity and the first water outlet of the fourth cavity are connected to a second heat, exchanger. A second water outlet, and a second water inlet that are used for connecting a load are disposed on the apparatus body. The first communication cavity communicates with the first cavity and the third cavity. The second water outlet communicates with the first communication cavity. The second communication cavity communicates with the second cavity and the fourth cavity. The second water inlet communicates with the second communication cavity. A first valve core is disposed in the first cavity. A first valve core is disposed in the second cavity. A first valve core is disposed in the third cavity. A first valve core is disposed in the fourth cavity. The first valve cores are able to control the on and off of the first communication cavity and the on and off of the second communication cavity.

Embodiments of the present application provide an indirect heat pump system. The indirect heat pump system includes the preceding refrigerant heat exchange apparatus.

BRIEF DESCRIPTION OF DRAWINGS

The present application is described in detail hereinafter in conjunction with drawings and embodiments.

REFERENCE LIST

Figure 1:
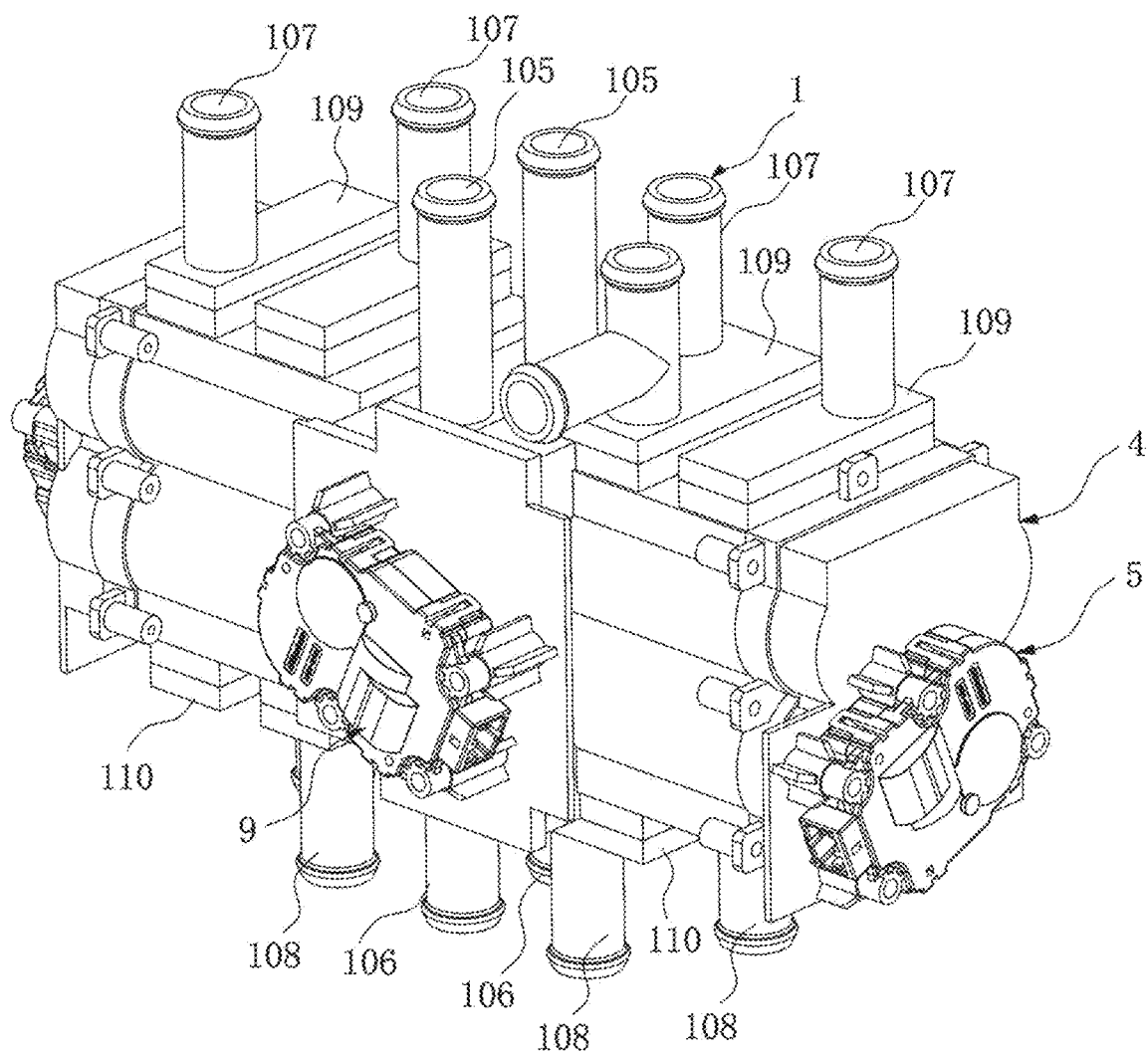
FIG. 1 is a view illustrating the structure of a refrigerant heat exchange apparatus according to an embodiment of the present application.
Figure 2:
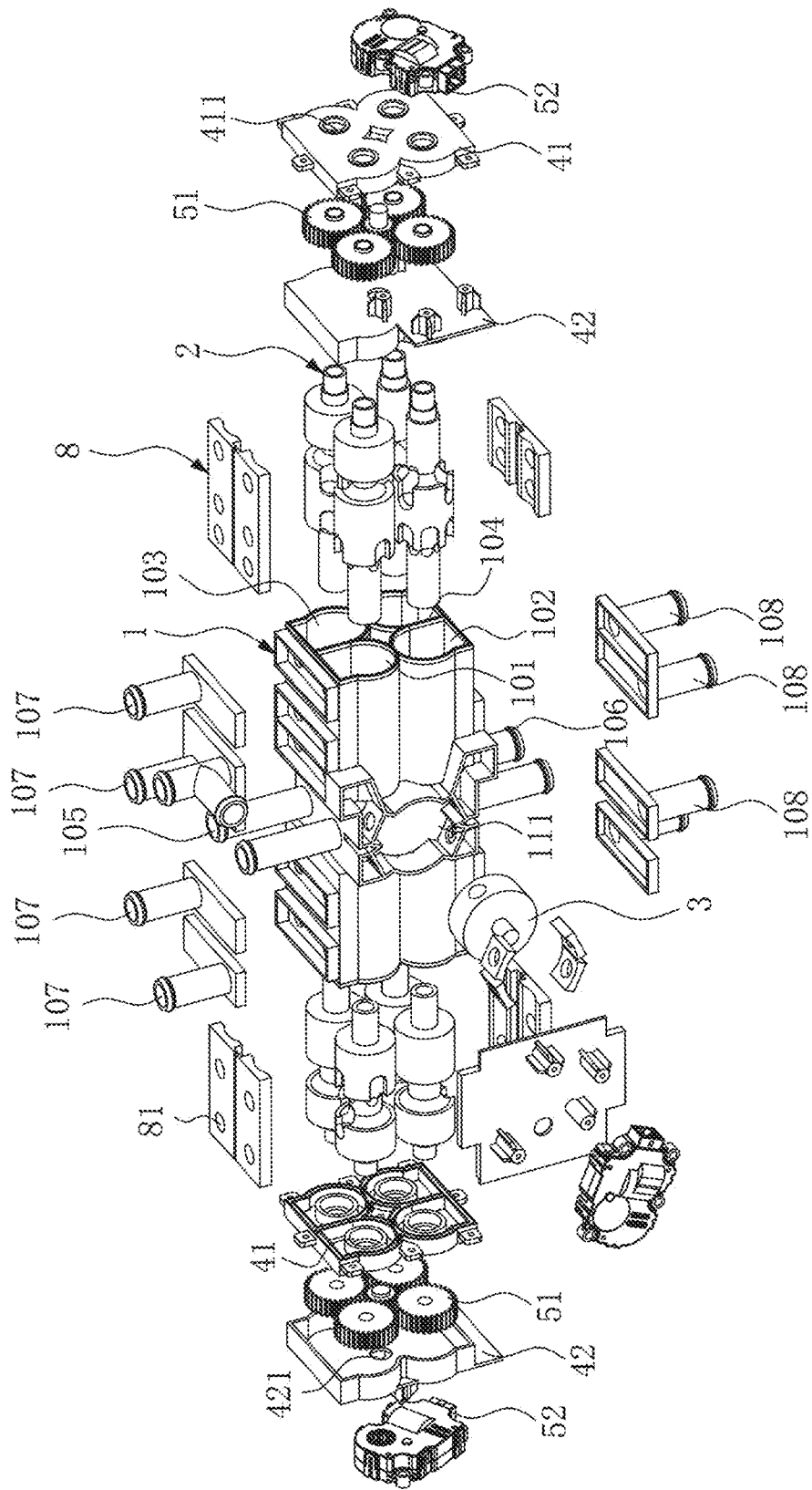
FIG. 2 is an exploded view illustrating the assembly of the refrigerant heat exchange apparatus according to the embodiment of the present application.
Figure 3:
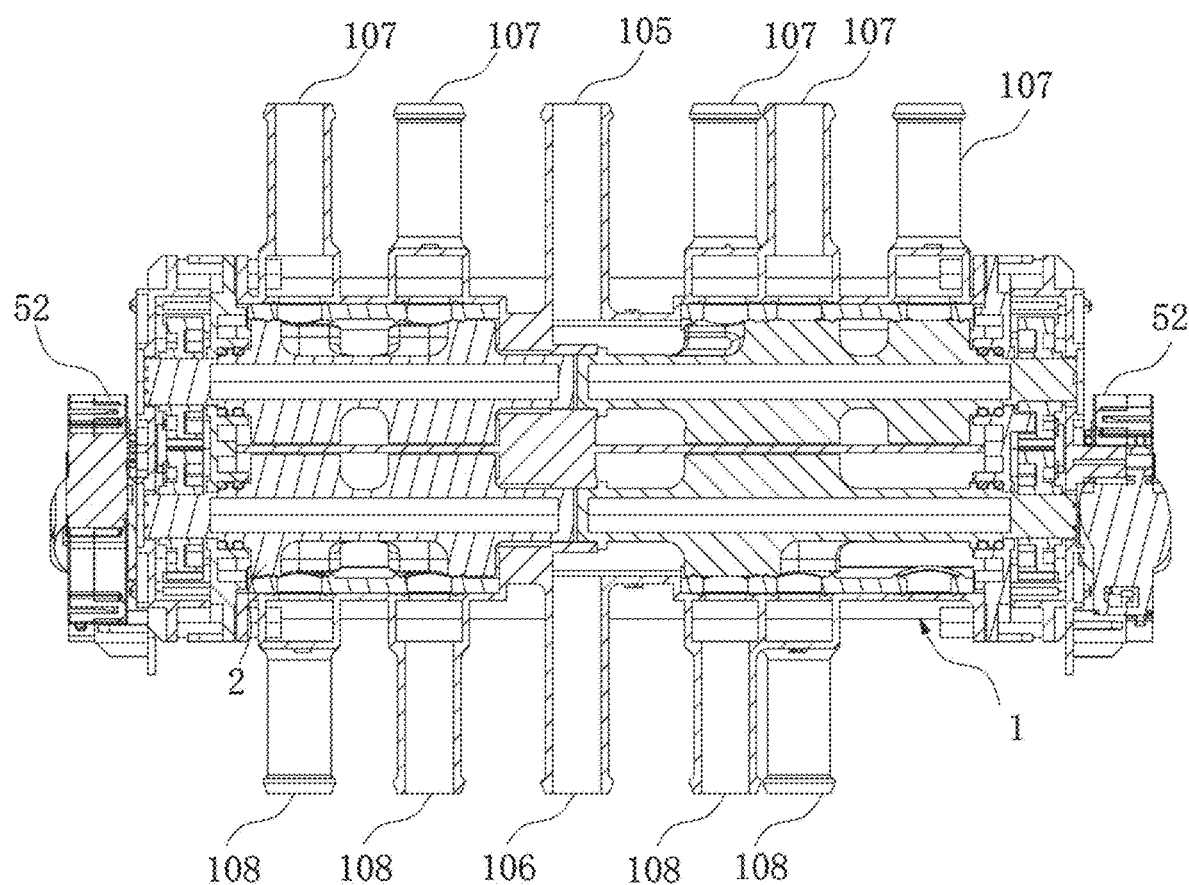
FIG. 3 is a first partial section view of the refrigerant heat exchange apparatus according to the embodiment of the present application.
Figure 4:
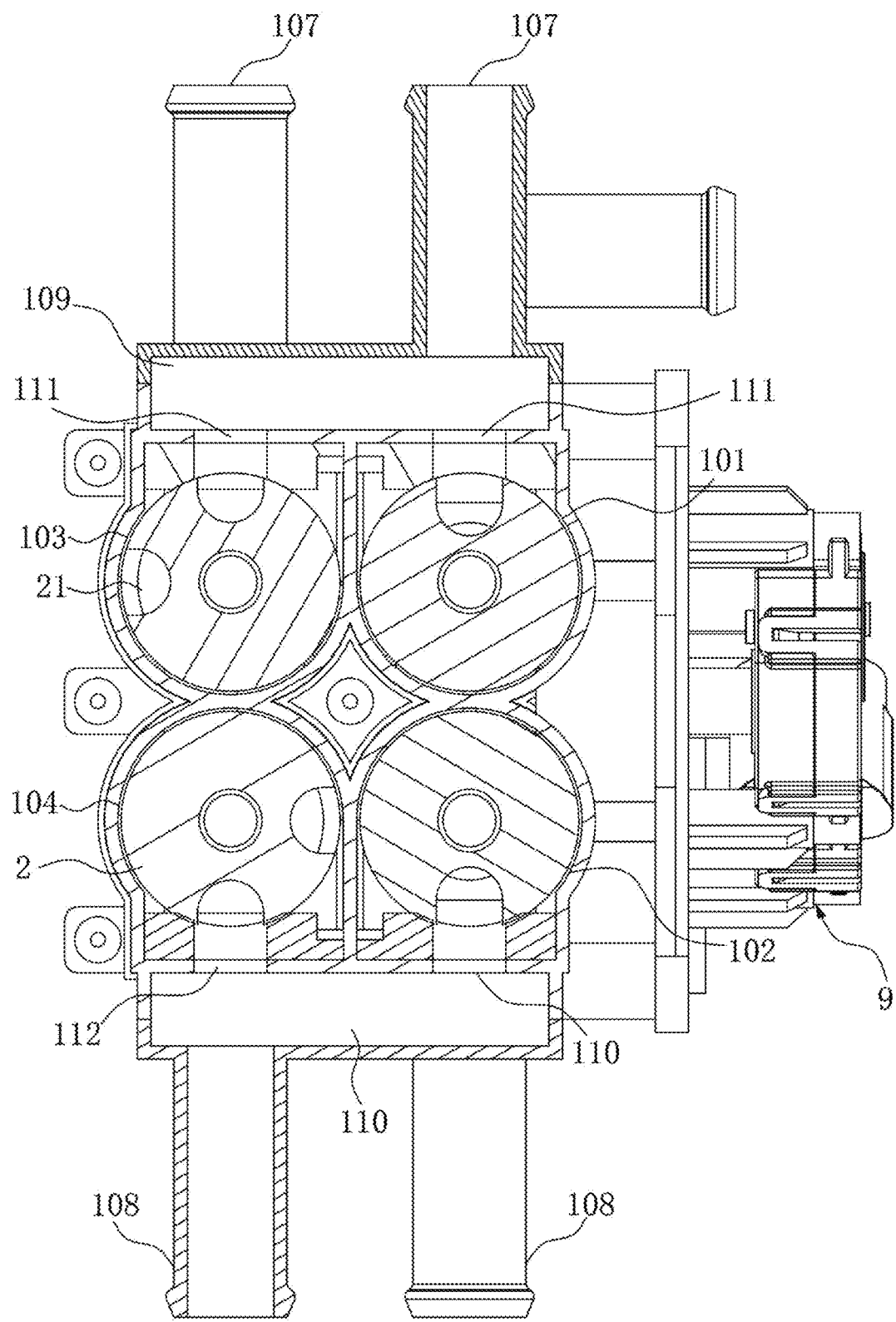
FIG. 4 is a second partial section view of the refrigerant heat exchange apparatus according to the embodiment of the present application.
Figure 5:
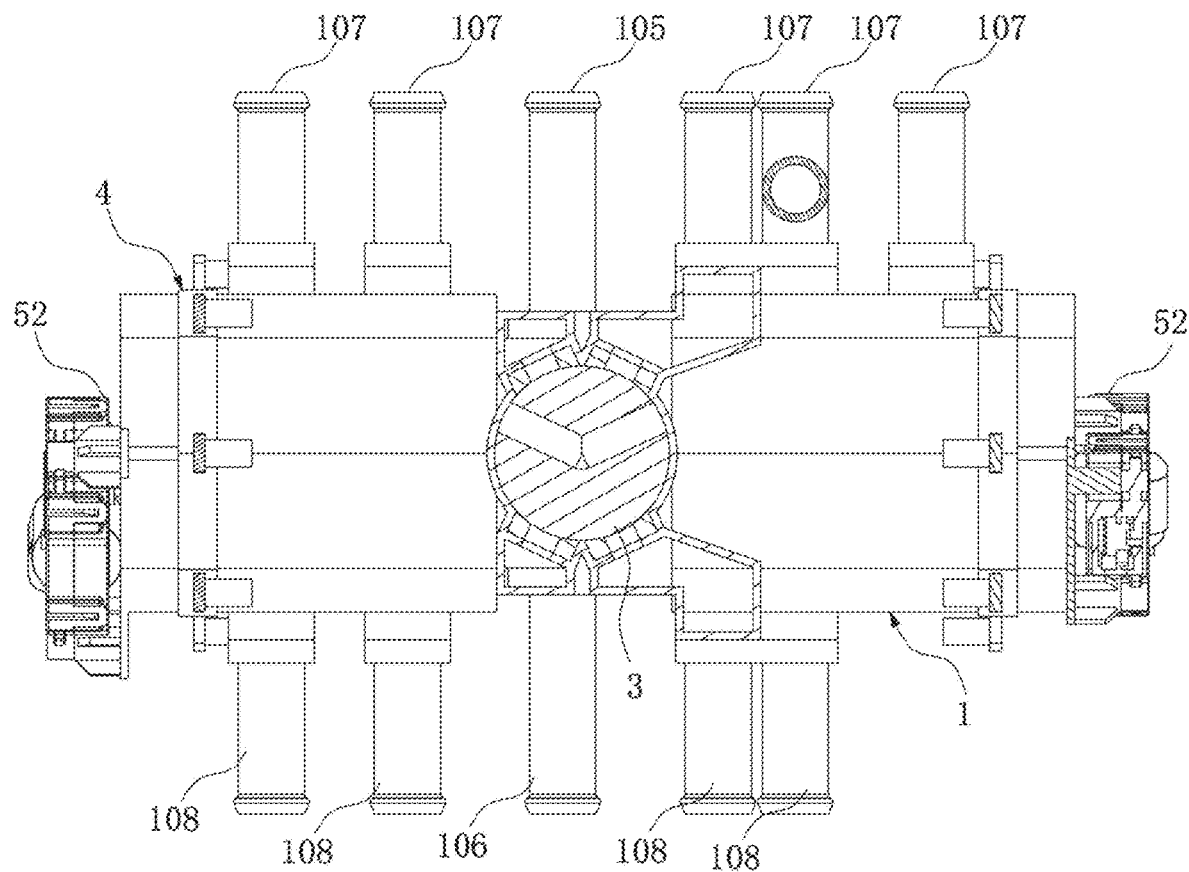
FIG. 5 is a third partial section view of the refrigerant heat exchange apparatus according to the embodiment of the present application.
Figure 6:
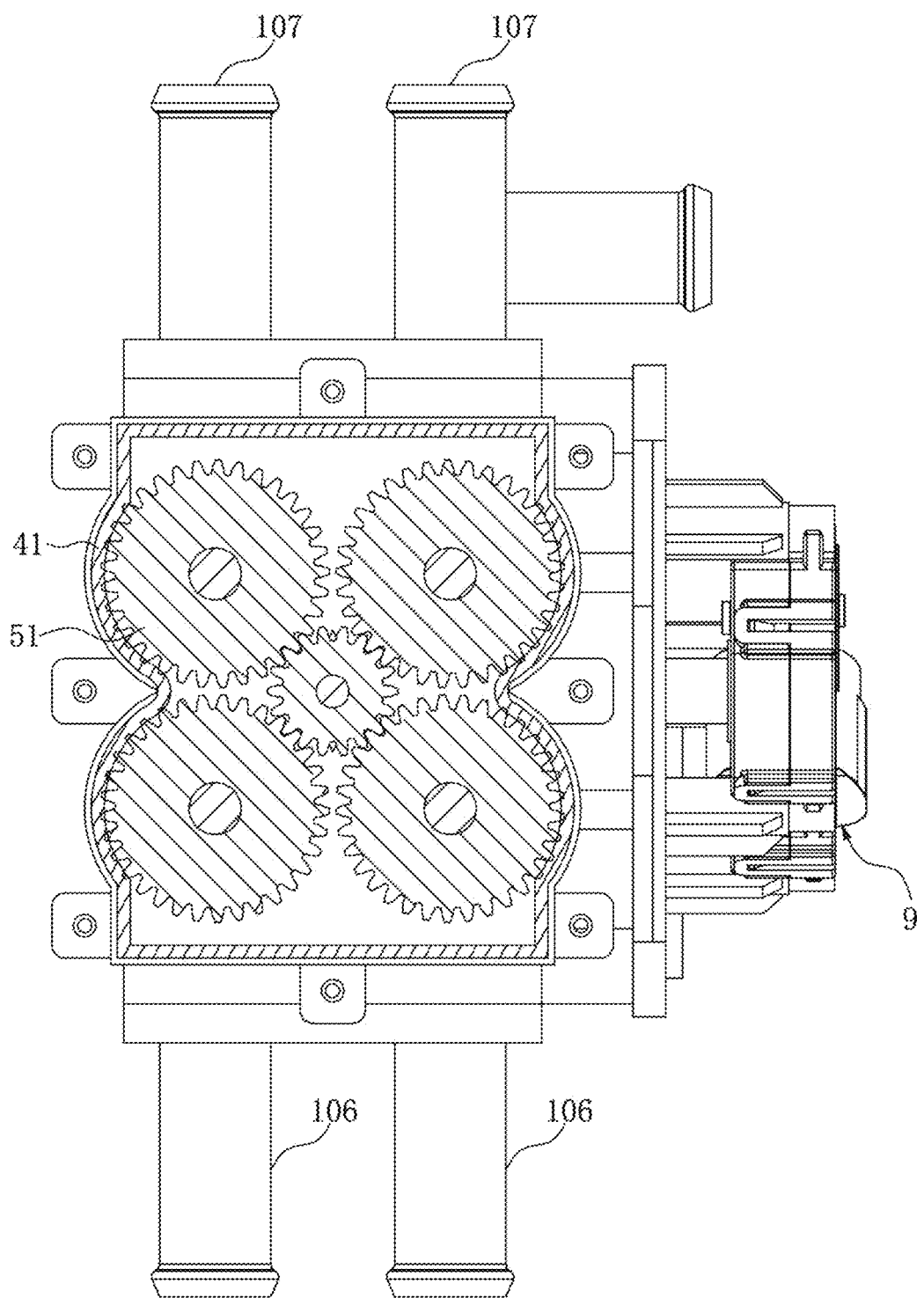
FIG. 6 is a fourth partial section view of the refrigerant heat exchange apparatus according to the embodiment of the present application.
Figure 7:
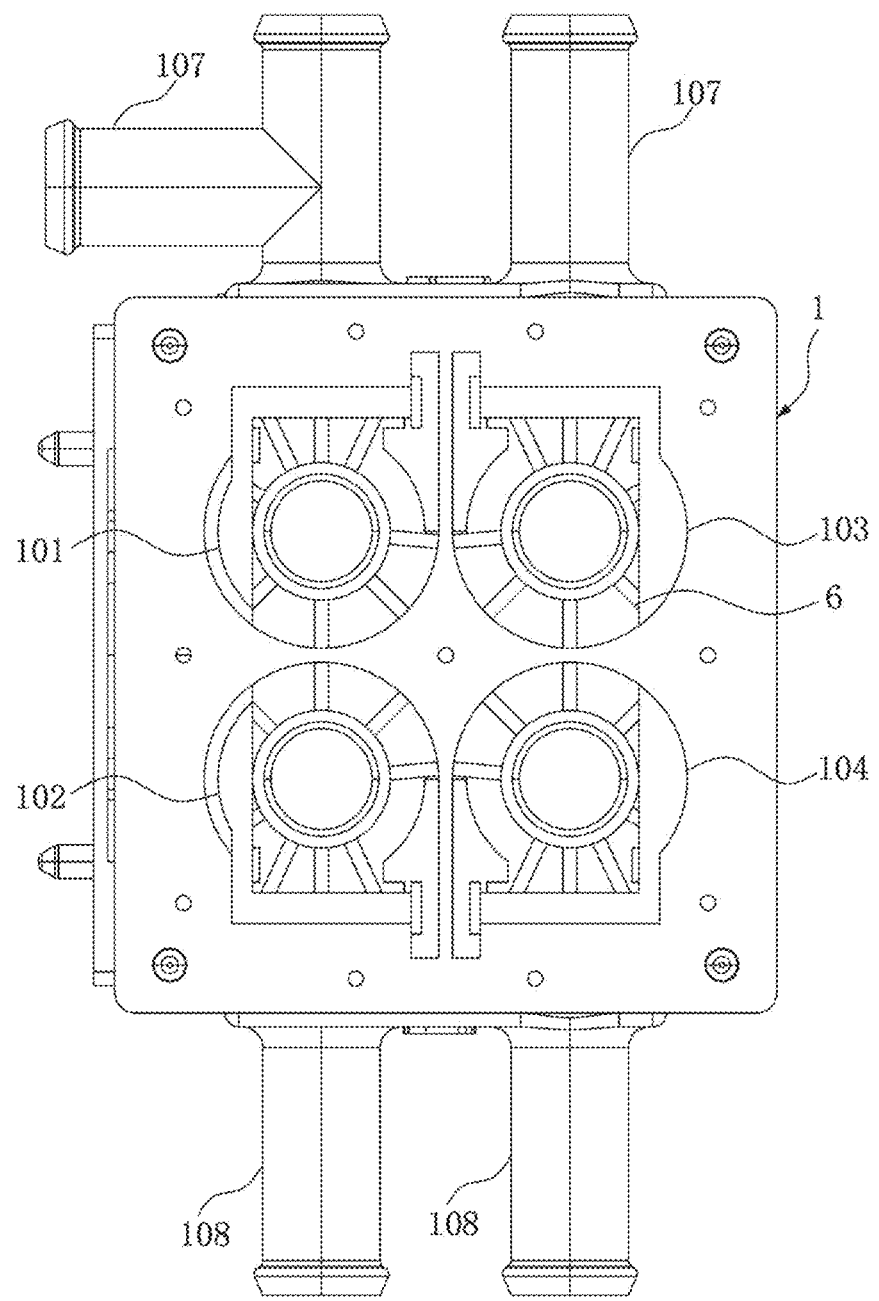
FIG. 7 is a view illustrating the structure of an apparatus body from a first perspective according to the embodiment of the present application.
Figure 8:
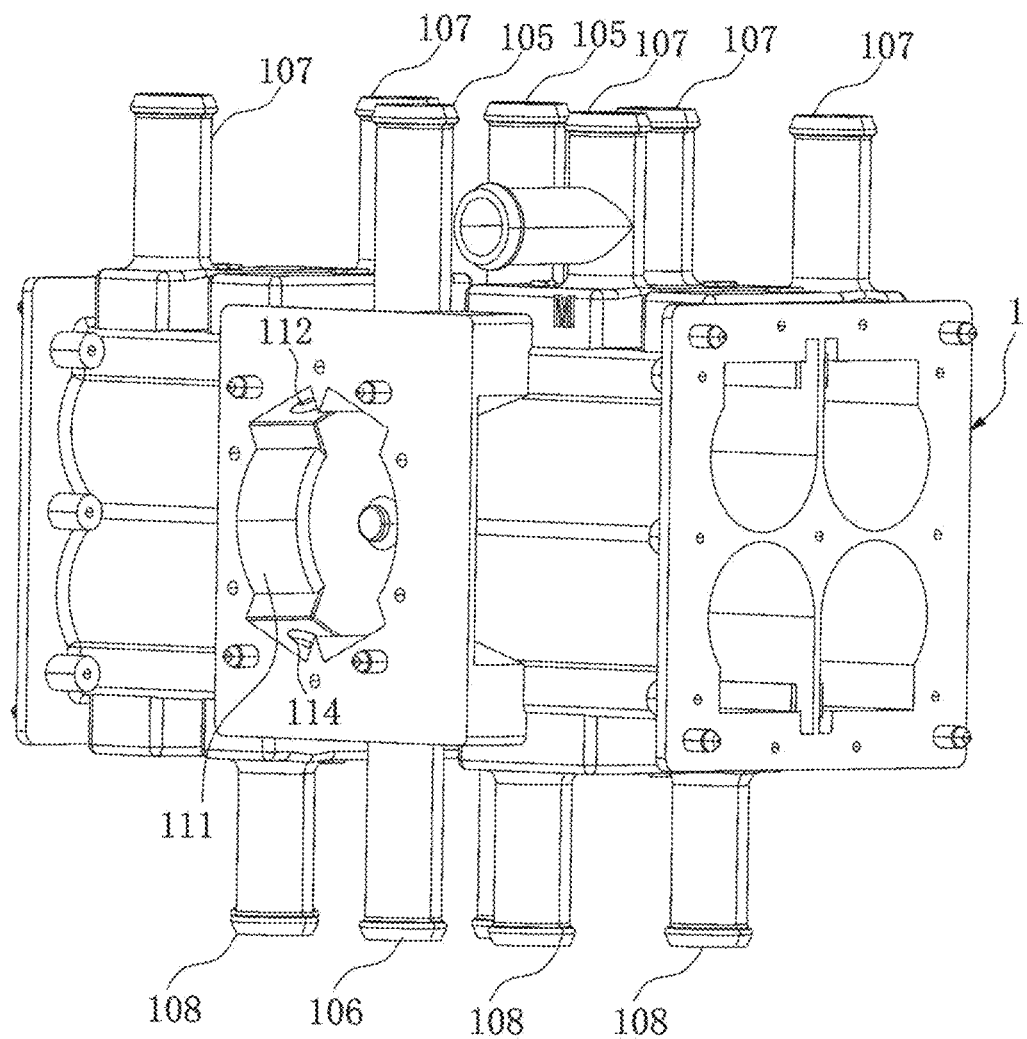
FIG. 8 is a view illustrating the structure of the apparatus body from a second perspective according to the embodiment of the present application.
Figure 9:
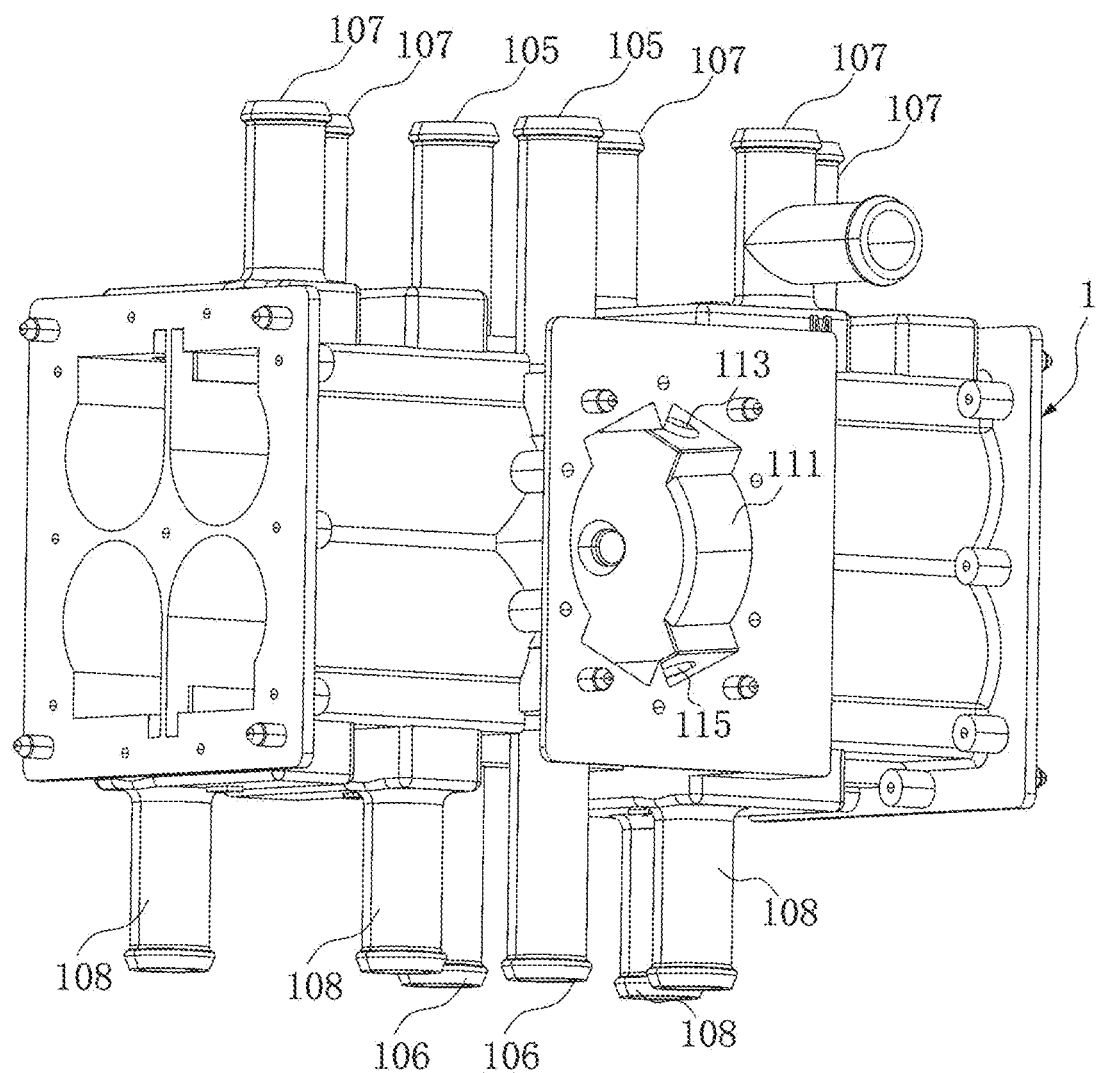
FIG. 9 is a view illustrating the structure of the apparatus body from a third perspective according to the embodiment of the present application.
Figure 10:
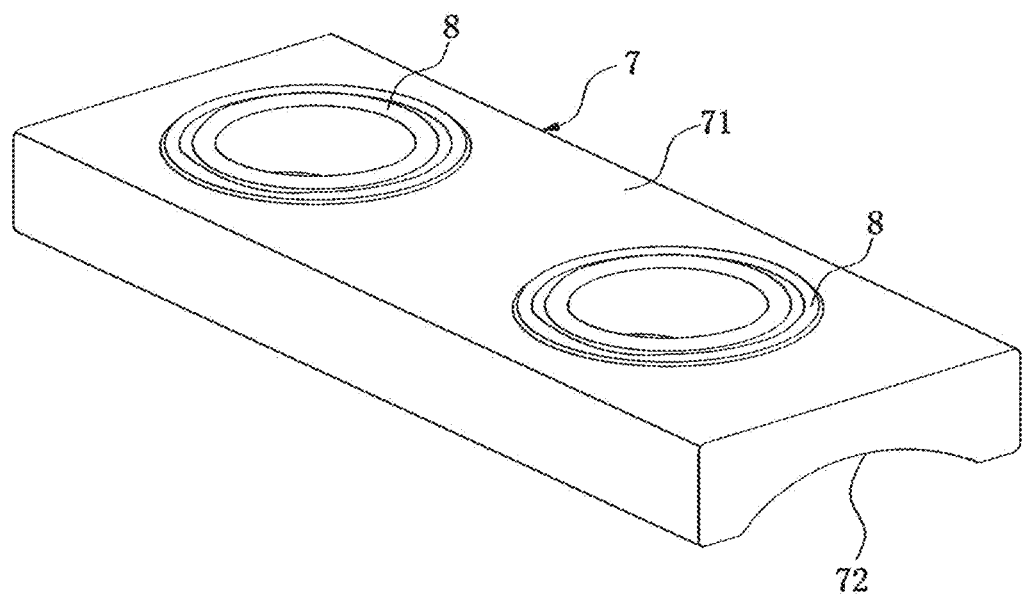
FIG. 10 is a view illustrating the structure after a sealing member and a mounting plate are assembled according to the embodiment of the present application.

1 apparatus body
101 first cavity
102 second cavity
103 third cavity
104 fourth cavity
105 first water inlet
106 first water outlet
107 second water outlet
108 second water inlet
109 first communication cavity
110 second communication cavity
111 mounting cavity
112 first through hole
113 second through hole
114 third through hole
115 fourth through hole
116 seventh through hole
117 first heat exchanger
118 second heat exchanger
119 load
2 first valve core
21 runner
3 second valve core
4 cover plate assembly
41 first cover plate
411 fifth through hole
42 second cover plate
421 sixth through hole
first drive member
51 gear assembly
52 motor
6 support member
7 mounting plate
71 abutting plane
72 matching arc surface
73 avoidance hole
8 sealing ring
9 second drive member

DETAILED DESCRIPTION

Embodiments of the present application are described in detail hereinafter in conjunction with drawings. The embodiments described hereinafter are part, not all of embodiments of the present application. Based on embodiments of this application, all other embodiments obtained by those skilled in the art without creative work are within the scope of the present application.

In the description of the present application, the term "connected to each other", "connected", or "secured" is to be construed in a broad sense, for example, as securely connected, detachably connected, or integrated; mechanically connected or electrically connected; directly connected to each other or indirectly connected to each other via an intermediary; or internally connected between two elements or interaction relations between two elements. For those of ordinary skill in the art, meanings of the preceding terms can be understood according to actual situations in the present application.

In the present application, when a first feature is described as "on" or "below" a second feature, the first feature and the second feature may be in direct contact or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

As shown in FIGS. 1 to 10, a refrigerant heat exchange apparatus provided in embodiments of the present application includes an apparatus body 1, first communication cavities 109, second communication cavities 110, and first valve cores 2. A cold water unit and a hot water unit are disposed in the apparatus body 1. The cold water unit includes a first cavity 101 and a second cavity 102. The hot water unit includes a third cavity 103 and a fourth cavity 104. A first water inlet 105 is disposed on the first cavity 101. A first water inlet 105 is disposed on the third cavity 103. A first water outlet 106 is disposed on the second cavity 102. A first water outlet 106 is disposed on the fourth cavity 104. The first water inlet 105 of the first cavity 101 and the first water outlet 106 of the second cavity 102 are connected to a first heat exchanger 117. The first water inlet 105 of the third cavity 103 and the first water outlet 106 of the fourth cavity 104 are connected to a second heat exchanger 118. Second water outlets 107 and second water inlets 108 that are used for connecting loads 119 are disposed on the apparatus body 1. The first communication cavities 109 communicate with the first cavity 101 and the third cavity 103. The second water outlets 107 communicate with the first communication cavities 109. The second communication cavities 110 communicate with the second cavity 102 and the fourth cavity 104. The second water inlets 108 communicate with the second communication cavities 110. A first valve core 2 is disposed in the first cavity 101. A first valve core 2 is disposed in the second cavity 102. A first valve core 2 is disposed in the third cavity 103. A first valve core 2 is disposed in the fourth cavity 104. The first valve cores 2 are able to control the on and off of the first communication cavities 109 and the on and off of the second communication cavities 110.

In an embodiment, the first valve core 2 in the first cavity 101 is able to control the on and off between the first cavity 101 and the first communication cavities 109. The first valve core 2 in the second cavity 102 is able to control the on and off between the second cavity 102 and the second communication cavities 110. The first valve core 2 in the third cavity 103 is able to control the on and off between the third cavity 103 and the first communication cavities 109. The first valve core 2 in the fourth cavity 104 is able to control the on and off between the fourth cavity 104 and the second communication cavities 110.

In an embodiment, the first communication cavities 109 communicate with the first cavity 101 and the third cavity 103. The second water outlets 107 communicate with the first communication cavities 109. The second communication cavities 110 communicate with the second cavity 102 and the fourth cavity 104. The second water inlets 108 communicate with the second communication cavities 110. The first valve cores 2 are able to control the on and off of the first communication cavities 109 and the on and off of the second communication cavities 110. Such an arrangement controls that only a low-temperature refrigerant or a high-temperature refrigerant flows out of the second water outlets 107 or that the two types of refrigerants flow out simultaneously, get mixed, and then flow out of the second water inlets 108. The arrangement in which the cold water unit is integrated with the hot water unit helps implement three modes of heat exchange, simplifying refrigerant pipelines. Simple pipeline wiring reduces cases of wrong wiring. Moreover, the use of control valves in the refrigerant pipelines is reduced, reducing costs and reducing the space occupied by the heat pump system. When the two types of refrigerants flow out simultaneously, the first valve cores 2 are configured to rotate to control flows of different refrigerants, thereby adjusting the temperature of a refrigerant flowing through a load 119, meeting the heat exchange requirements of different loads 119, thus improving the performance of the loads 119, and reducing power consumption.

In an embodiment, multiple different runners 21 are disposed on the first valve cores 2. The first valve cores 2 are rotated selectively so that different runners 21 are driven to make the first water inlets 105 communicate with the second water outlets 107 and make the first water outlets 106 communicate with the second water inlets 108.

Different first valve cores 2 are configured to rotate to make different runners 21 communicate with different second water outlets 107 or different second water inlets 108. A refrigerant exchanges heat with a load 119 through a communicated second water inlet 108 and a communicated second water outlet 107, thereby controlling the heat exchange with a load 119 requiring heat exchange.

In this embodiment, a second valve core 3 is disposed on the apparatus body 1 and is able to control the on and off of the first water inlet 105 and the on and off of the first water outlet 106. The second valve core 3 is configured to rotate to make a refrigerant pass through a heat exchanger from the first water inlet 105 of the cold water unit and flow to a second water outlet 107 of the cold water unit or make a refrigerant pass through a heat exchanger from the first water inlet 105 of the hot water unit and flow to a second water outlet 107 of the hot water unit. In this case, cooling or heating is performed with no need of exchanging heat through the second water outlet 107 or the second water inlet 108, improving the efficiency of heat exchange.

In an embodiment, a mounting cavity 111 is disposed on the apparatus body 1. A first through hole 112, a second through hole 113, a third through hole 114, and a fourth through hole 115 are disposed in the mounting cavity 111. The first through hole 112 communicates with the first cavity 101. The second through hole 113 communicates with the first cavity 101 through a first communication cavity 109. The third through hole 114 communicates with the second cavity 102. The fourth through hole 115 communicates with the second cavity 102 through a second communication cavity 110. The second valve core 3 is disposed in the mounting cavity 111. The second valve core 3 is configured to rotate to make the first through hole 112 communicate with the fourth through hole 115 or make the second through hole 113 communicate with the third through hole 114. When the second valve core 3 communicates with the first through hole 112 and the fourth through hole 115, a refrigerant flows from the first water inlet 105 to the fourth through hole 115 through the first through hole 112, enters a second communication cavity 110, and flows out of the first water outlet 106. When the second valve core 3 communicates with the second through hole 113 and the third through hole 114, a refrigerant flows from the first water inlet 105 into a second communicate cavity 112, passes through the second through hole 113, flows to the third through hole 114, and flows out of the first water outlet 106.

In an embodiment, a second drive member 9 is disposed on the second valve core 3 and drives the second valve core 3 to rotate. The second valve core 3 is cylindrical. To stop cooling or heating, the second valve core 3 is rotated to make a port on the second valve core 3 not communicate with the first water inlet 105 or the first water outlet 106.

In this embodiment, a plurality of first communication cavities 109 and a plurality of second communication cavities 110 are arranged. Each first communication cavity 109 communicates with at least one second water outlet 107. Each second communication cavity 110 communicates with at least one second water inlet 108. The arrangement of the first communication cavities 109 and the second communication cavities 110 enables more loads 119 to be connected to so that heat exchange is performed on the loads 119 simultaneously.

In this embodiment, openings are disposed on the apparatus body 1 in a first direction (length direction). The first cavity 101, the second cavity 102, the third cavity 103, and the fourth cavity 104 each communicate with an opening. A cover plate assembly 4 is disposed on the opening. The cover plate assembly 4 is detachably connected to the apparatus body 1 to cover the opening. The arrangement in which the cover plate assembly 4 is detachably connected to the apparatus body 1 facilitates the mounting of the first valve cores 2. Moreover, the cover plate assembly 4 can guarantee the sealing property of the apparatus body 1.

In an embodiment, the cover plate assembly 4 includes a first cover plate 41 and a second cover plate 42. The first cover plate 41 is formed with a plurality of fifth through holes 411 at positions corresponding to the first valve cores 2. The first valve cores 2 pass through the fifth through holes 411 and are connected to first drive members 5. The first drive members 5 are configured to drive the first valve cores 2 to rotate, thereby controlling the on and off of the second water outlets 107 and the on and off of the second water inlets 108. Moreover, the rotation angle of the first valve core 2 can also be controlled, thereby controlling the flow speed of a refrigerant at the position where a runner 21 on the first valve core 2 communicates with a second water outlet 107 or a second water inlet 108. When a low-temperature refrigerant and a high-temperature refrigerant communicate with the second water outlets 107 simultaneously, the flow of the low-temperature refrigerant and the flow of the high-temperature refrigerant are controlled. The neutralization of the low-temperature refrigerant and high-temperature refrigerant with different flows adjusts the temperatures of the refrigerants flowing out of the second water outlets 107, satisfying heat exchange temperatures of different loads 119 and improving the performance of the loads 119.

In an embodiment, a closed accommodating cavity is disposed between the first cover plate 41 and the second cover plate 42. The second cover plate 42 is provided with a sixth through hole 421. A first drive member 5 includes a gear assembly 51 and a motor 52. The gear assembly 51 is mounted in the accommodating cavity. The motor 52 is mounted on the side of the second cover plate 42 facing away from the first cover plate 41. The motor 52 is in transmission connection with the gear assembly 51. One first valve core 2 is connected to one driven gear. The motor 52 is connected to one driving gear. The driven gear meshes with the driving gear. The motor 52 drives the driving gear to rotate so as to drive the driven gear to rotate together. The driven gear is configured to rotate to drive the first valve core 2 to rotate. The first valve core 2 is configured to rotate to control flows of different refrigerants.

In this embodiment, two first valve cores 2 are disposed in the first cavity 101 in the length direction of the first cavity 101. Two first valve cores 2 are disposed in the second cavity 102 in the length direction of the second cavity 102. Two first valve cores 2 are disposed in the third cavity 103 in the length direction of the third cavity 103. Two first valve cores 2 are disposed in the fourth cavity 104 in the length direction of the fourth cavity 104. Two first valve cores 2 in the same cavity are connected to each other through a support member 6. Two first drive members 5 are disposed on two opposite sides of the apparatus body 1. One first drive member 5 drives four first valve cores 2 on the same side as the first drive member 5 to rotate. The arrangement of the support member 6 can support two first valve cores 2 in the same cavity so that the rotation center of the first valve cores 2 and the rotation center of the first drive member 5 are always on the same straight line, guaranteeing the smooth rotation of the first valve cores 2 and preventing the first valve cores 2 from shifting. The shift of the first valve cores 2 causes a refrigerant to flow out of another second water outlet 104 and another second water inlet 108, making the first valve core 2 lose the control function. A first drive member 5 drives first valve cores 2 on one side, and the other first drive member 5 drives first valve cores 2 on the other side. Different first valve cores 2 are rotated to result in more combinations in which runners 21 of different first valve cores 2 communicate with the second water outlets 107 or the second water inlets 108, facilitating the control of the first valve cores 2 exchanging heat with different loads 119.

In this embodiment, the first communication cavities 109 communicate with the first cavity 101 through a seventh through hole 116 and communicate with the third cavity 103 through a seventh through hole 116. The second communication cavities 110 communicate with the second cavity 102 through a seventh through hole 116 and communicate with the fourth cavity 104 through a seventh through hole 116. The four cavities are each provided with a flat mounting surface at the position of the seventh through hole 116. A mounting plate 7 is detachably disposed on the mounting surface. The mounting plate 7 has an abutting plane 71 abutting against the mounting surface and a matching arc surface 72 matching the first valve core 2. A sealing ring 8 is disposed between the abutting plane 71 and the mounting surface. The mounting plate 7 is formed with an avoidance hole 73 at a position corresponding to the seventh through hole 116. The avoidance hole 73 communicates with the abutting plane 71 and the matching arc surface 72. Because side walls of the first valve core 2 and four cavities are arc-shaped, the arrangement of the mounting plate 7 facilitates the mounting of the sealing ring 8. The abutting plane 71 of the mounting plate 7 abuts against the mounting surface. Through a runner 21 on the first valve core 2, a refrigerant flows out of a first communication cavity 109 and a second communication cavity 110 from the avoidance hole 73 and the seventh through hole 116. The arrangement of the mounting plate 7 and the sealing ring 8 guarantees that each first communication cavity 109 is isolated from each second communication cavity 110.

Figure 11:
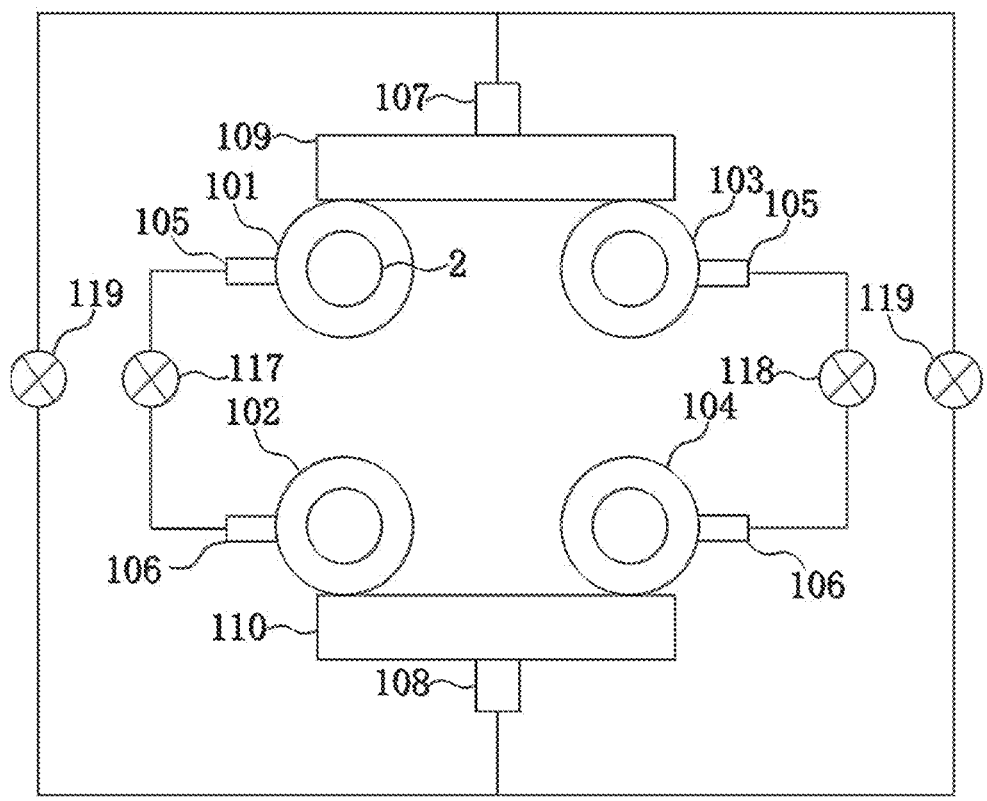
FIG. 11 is a diagram illustrating the working principle of the refrigerant heat exchange apparatus according to the embodiment of the present application.

As shown in FIG. 11, the working principle of the preceding refrigerant heat exchange apparatus is as follows: When an element needs to be cooled, a refrigerant passes through the first heat exchanger 117, flows into the first cavity 101 through the first water inlet 105, passes through a first communication cavity 109 and the second water outlet 107 to enter a load 119, flows from the load 119 to the second water inlet 108 and a second communication cavity 110, enters the second cavity 102, and then returns to the first heat exchanger 117 from the first water outlet 106.

When an element needs to be heated, a refrigerant passes through the second heat exchanger 118, flows into the third cavity 103 through the first water inlet 105, passes through the first communication cavity 109 and the second water outlet 107 to enter a load 119, flows from the load 119 to the second water inlet 108 and the second communication cavity 110, enters the fourth cavity 104, and then returns to the second heat exchanger 118 from the first water outlet 106.

When the two types of refrigerants flow out simultaneously, a refrigerant passes through the first heat exchanger 117 and flows into the first cavity 101 through the first water inlet 105, and the other refrigerant passes through the second heat exchanger 118 and flows into the third cavity 103 through the first water inlet 105. The two types of refrigerant get mixed, then pass through the first communication cavity 109 and the second water outlet 107 to enter loads 119, flow from the loads 119 to the second water inlet 108 and the second communication cavity 110, enter the fourth cavity 104, and then return to the first heat exchanger 117 and the second heat exchanger 118 from two first water outlets 106.

In an embodiment, a first communication cavity communicates with the first cavity and the third cavity. The second water outlet communicates with the first communication cavity. A second communication cavity communicates with the second cavity and the fourth cavity. The second water inlet communicates with the second communication cavity. The first valve cores are able to control the on and off of the first communication cavity and the on and off of the second communication cavity. Such an arrangement controls that only a low-temperature refrigerant or a high-temperature refrigerant flows out of the second water outlet or that the two types of refrigerants flow out simultaneously, get mixed, and then flow out of the second water inlet. The arrangement in which the cold water unit is integrated with the hot water unit helps implement three modes of heat exchange, simplifying refrigerant pipelines. Simple pipeline wiring reduces the use of pipeline control valves. When the two types of refrigerants flow out simultaneously, the first valve cores are configured to rotate to control flows of different refrigerants, thereby adjusting the temperature of a refrigerant flowing through a load, meeting the heat exchange requirements of different loads, thus improving the performance of the loads, and reducing power consumption.

Embodiments of the present application further disclose an indirect heat pump system including the refrigerant heat exchange apparatus according to any preceding embodiment, simplifying pipelines of the heat pump system, reducing the space occupied by the heat pump system, and providing convenience for mounting the heat pump system on a vehicle.

In the description of the present application, it is to be understood that the orientation or position relationships indicated by terms "above" and the like are the orientation or position relationships shown in the drawings, merely for ease of description and simplifying operations, and these relationships do not indicate or imply that the referred device or component has a specific orientation and is constructed and operated in a specific orientation.

In the description of the specification, the description of reference terms "an embodiment" and the like means that features, structures, materials or characteristics described in connection with the embodiment are included in at least one embodiment or example of the present application. In the specification, the schematic representation of the preceding terms does not necessarily refer to the same embodiment.

Moreover, it is to be understood that although this specification is described in terms of the embodiments, not each embodiment includes only one independent technical solution. Such description mode of the specification is merely for the sake of clarity, and those skilled in the art should regard the specification as a whole. The technical solutions in the embodiments may also be appropriately combined to form other embodiments which will be understood by those skilled in the art.

What is claimed is:

1. A refrigerant heat exchange apparatus, comprising:
    an apparatus body, wherein a cold water unit and a hot water unit are disposed in the apparatus body, the cold water unit comprises a first cavity and a second cavity, the hot water unit comprises a third cavity and a fourth cavity, a first water inlet is disposed on the first cavity, a first water inlet is disposed on the third cavity, a first water outlet is disposed on the second cavity, a first water outlet is disposed on the fourth cavity, the first water inlet of the first cavity and the first water outlet of the second cavity are connected to a first heat exchanger, the first water inlet of the third cavity and the first water outlet of the fourth cavity are connected to a second heat exchanger, and a second water outlet and a second water inlet that are used for connecting a load are disposed on the apparatus body;
    a first communication cavity communicating with the first cavity and the third cavity, wherein the second water outlet communicates with the first communication cavity;
    a second communication cavity communicating with the second cavity and the fourth cavity, wherein the second water inlet communicates with the second communication cavity; and
    first valve cores, wherein a first valve core of the first valve cores is disposed in the first cavity, a first valve core of the first valve cores is disposed in the second cavity, a first valve core of the first valve cores is disposed in the third cavity, a first valve core of the first valve cores is disposed in the fourth cavity, and the first valve cores can be controlled ON and OFF relative to the first communication cavity and ON and OFF relative to the second communication cavity;
    wherein a second valve core is disposed on the apparatus body and can be controlled ON and OFF at the first water inlet and ON and OFF at the first water outlet;
    wherein a mounting cavity is disposed on the apparatus body; a first through hole, a second through hole, a third through hole, and a fourth through hole are disposed in the mounting cavity; the first through hole communicates with the first cavity; the second through hole communicates with the first cavity through the first communication cavity; the third through hole communicates with the second cavity; the fourth through hole communicates with the second cavity through the second communication cavity; the second valve core is disposed in the mounting cavity; and the second valve core is configured to rotate to make the first through hole communicate with the fourth through hole or make the second through hole communicate with the third through hole;
    wherein the first communication cavity communicates with the first cavity through a seventh through hole and communicates with the third cavity through a seventh through hole, and the second communication cavity communicates with the second cavity through a seventh through hole and communicates with the fourth cavity through a seventh through hole; and the four cavities are each provided with a flat mounting surface at a position of the seventh through hole, a mounting plate is detachably disposed on the mounting surface, the mounting plate has an abutting plane abutting against the mounting surface and a matching arc surface matching the first valve core, a sealing ring is disposed between the abutting plane and the mounting surface, the mounting plate is formed with an avoidance hole at a position corresponding to the seventh through hole, and the avoidance hole communicates with the abutting plane and the matching arc surface.

2. The refrigerant heat exchange apparatus according to claim 1, wherein a plurality of first communication cavities and a plurality of second communication cavities are arranged.

3. An indirect heat pump system, comprising the refrigerant heat exchange apparatus according to claim 2.

4. The refrigerant heat exchange apparatus according to claim 1, wherein openings are disposed on the apparatus body in a first direction; the first cavity, the second cavity, the third cavity, and the fourth cavity each communicate with an opening of the openings; a cover plate assembly is disposed on the opening; and the cover plate assembly is detachably connected to the apparatus body to cover the opening.

5. An indirect heat pump system, comprising the refrigerant heat exchange apparatus according to claim 4.

6. The refrigerant heat exchange apparatus according to claim 4, wherein the cover plate assembly comprises a first cover plate and a second cover plate, the first cover plate is formed with a plurality of fifth through holes at positions corresponding to the first valve cores, and the first valve cores pass through the plurality of fifth through holes and are connected to a first drive member including a gear assembly and a motor.

7. An indirect heat pump system, comprising the refrigerant heat exchange apparatus according to claim 6.

8. The refrigerant heat exchange apparatus according to claim 6, wherein a closed accommodating cavity is disposed between the first cover plate and the second cover plate, the second cover plate is provided with a sixth through hole, the gear assembly is mounted in the accommodating cavity, the motor is mounted on a side of the second cover plate facing away from the first cover plate, and the motor is in transmission connection with the gear assembly.

9. An indirect heat pump system, comprising the refrigerant heat exchange apparatus according to claim 8.

10. The refrigerant heat exchange apparatus according to claim 8, wherein two first valve cores of the first valve cores are disposed in the first cavity in a length direction of the first cavity, two first valve cores of the first valve cores are disposed in the second cavity in a length direction of the second cavity, two first valve cores of the first valve cores are disposed in the third cavity in a length direction of the third cavity, two first valve cores of the first valve cores are disposed in the fourth cavity in a length direction of the fourth cavity, two first valve cores among the first valve cores and in the same cavity are connected to each other through a support member, two first drive members are disposed on two opposite sides of the apparatus body, and one first drive member of the two first drive devices drives four first valve cores among the first valve cores and on a same side as the one first drive member to rotate.

11. An indirect heat pump system, comprising the refrigerant heat exchange apparatus according to claim 10.

12. An indirect heat pump system, comprising the refrigerant heat exchange apparatus according to claim 1.

* * * * *